(No Model.)
W. T. ELLIOT.
ANIMAL POKE.
No. 477,651. Patented June 28, 1892.
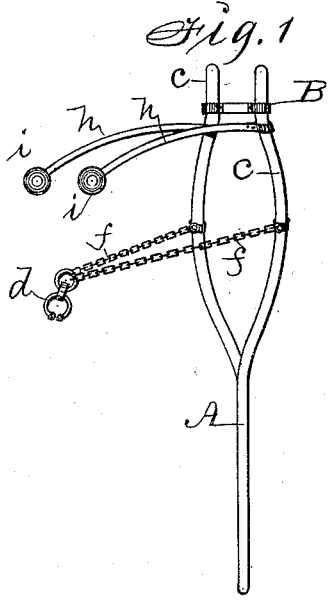
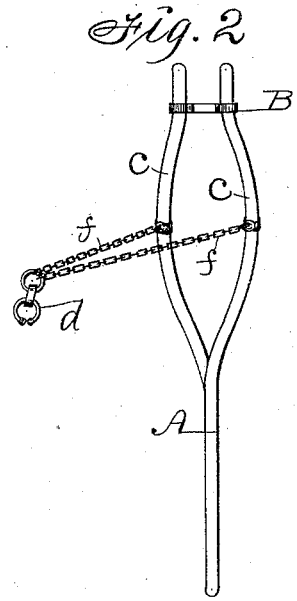
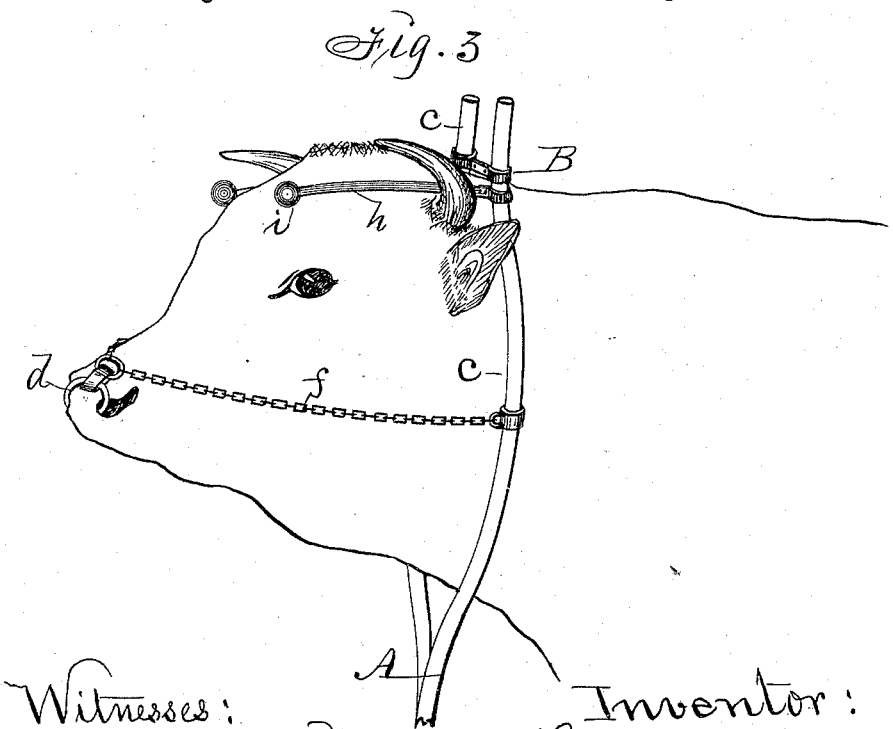
Witnesses:
R. H. Orwig.
A. W. Sues.
Inventor:
William T. Elliot.
By Thomas G. Orwig, Atty.
THE NORRIS PETERS CO., PHOTO-LITHO., WASHINGTON, D. C.

UNITED STATES PATENT OFFICE.

WILLIAM T. ELLIOT, OF KENT, IOWA.

ANIMAL-POKE.

SPECIFICATION forming part of Letters Patent No. 477,651, dated June 28, 1892.

Application filed January 28, 1891. Serial No. 379,479. (No model.)

*To all whom it may concern:*

Be it known that I, WILLIAM T. ELLIOT, a citizen of the United States of America, residing at Kent, in the county of Union and State of Iowa, have invented an Improved Animal-Poke, of which the following is a specification.

My invention consists in the combination of a ring and chains and artificial horns with a forked bar, as hereinafter set forth, pointed out in my claims, and illustrated in the accompanying drawings, in which—

Figure 1 is a perspective view of the complete device. Fig. 2 is a perspective view showing the artificial horns detached. Fig. 3 is a perspective view showing the complete device applied to an animal as required for practical use.

A represents a forked bar that may vary in size and weight and that is preferably made of hard wood.

B is a cross-bar that has eyes at its ends adapted to admit the ends of the branches c of the bar A for the purpose of yoking the branches together and around an animal's neck. The cross-bar is detachably fastened to the branches by means of screws or in any suitable way, so that the complete device can be readily put on and off an animal; or a leather strap may be substituted for the cross-bar.

d is a nose-ring of common form, combined with the branches c by means of chains f in such a manner that the ring can be fixed to the animal's nose when the branches are around the animal's neck.

h h represent prongs or artificial horns fixed to the branches c in such a manner that they will project forward over an animal's head, as illustrated in Fig. 3. Enlargements or knobs i are fixed on the free ends of the horns.

In the practical use of my invention when placed on a breachy or vicious animal the force applied to the top or bottom part of the forked bar when it comes in contact with a fence as the animal makes an effort to break through will by means of the chains be transferred to the ring in the nose and pain the animal and cause it to make a backward motion and to desist from trying to break through the fence; and when an animal has a poke on that is provided with the artificial horns and attempts to gore or to use the natural horns for injuring a person, animal, or any other object the artificial horns will transmit force to the branches of the bar around the neck, and by means of the chains from the bar to the ring, as required, to pull backward on the ring and to cause pain to the animal's nose, as required, to check the forward movement of the animal and to prevent it from doing damage with the horns.

I claim as my invention—

1. An improved animal-poke comprising a forked bar, a cross-bar connecting the top-end portions of the branches of the said forked bar, chains attached to the central part of the said branches and connected with a ring, which is to connect with another ring in an animal's nose, to operate in the manner set forth, for the purposes stated.

2. An improved animal-poke comprising a forked bar, a cross-bar for connecting the top-end portions of the branches of said bar, prongs or artificial horns fixed to the top portions of the said branches of the forked bar to project forward, and chains attached to the central parts of the said branches, connected with a ring, which ring is to connect with a ring in an animal's nose, arranged and combined to operate in the manner set forth.

WILLIAM T. ELLIOT.

Witnesses:
   A. E. KEITH,
   I. N. FIELDS.